Jan. 18, 1966   T. H. HOCK   3,229,792
VEHICLE CONTROL SYSTEM
Filed Nov. 29, 1962   2 Sheets-Sheet 1

INVENTOR.
THOMAS H. HOCK
BY
Bayard H. Michael
ATTORNEY

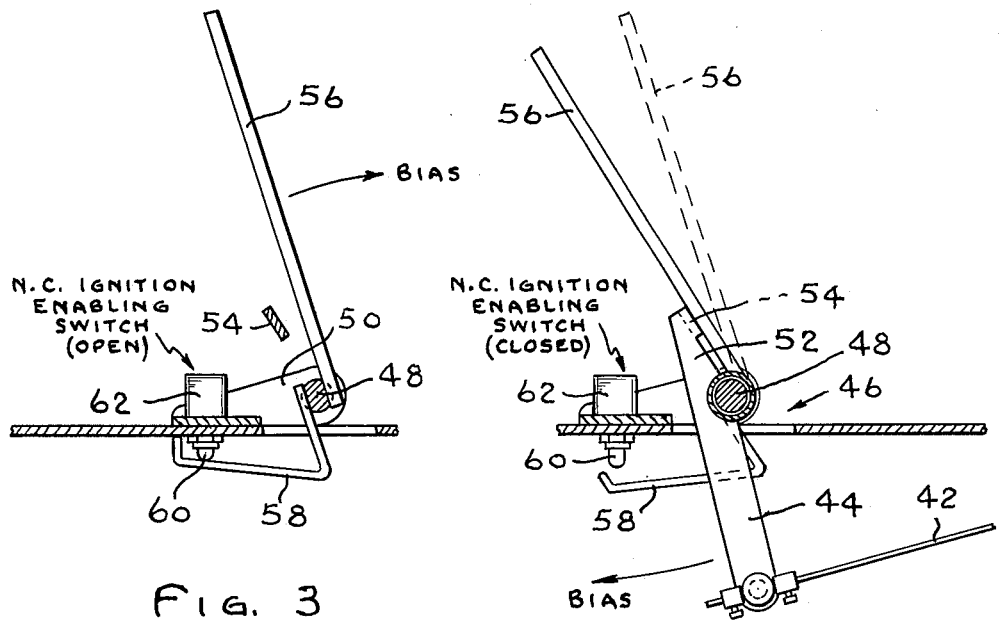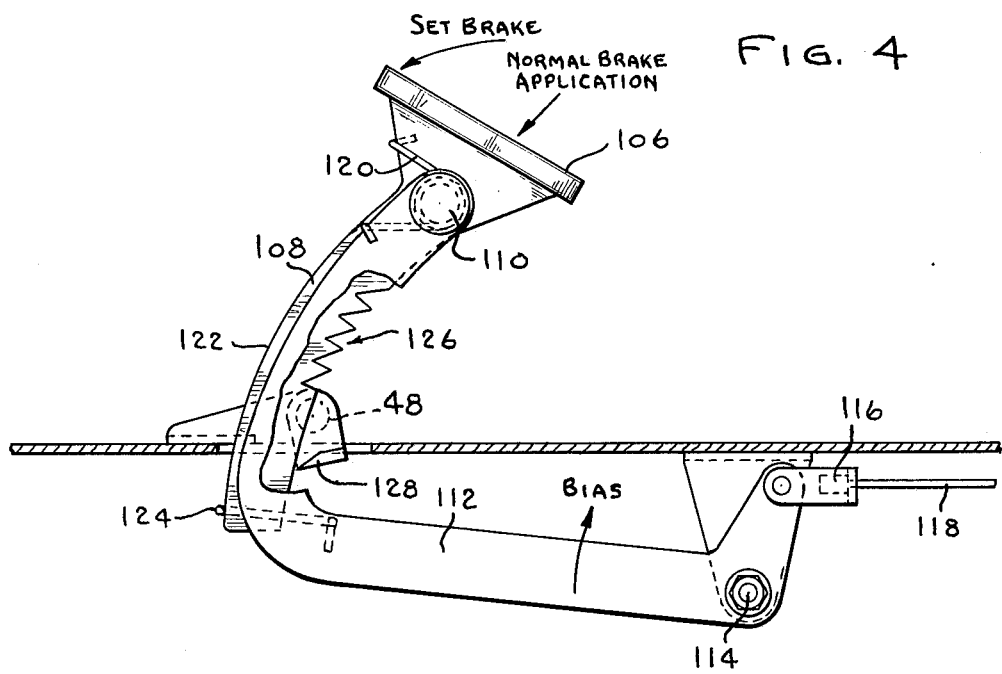

United States Patent Office 3,229,792
Patented Jan. 18, 1966

3,229,792
VEHICLE CONTROL SYSTEM
Thomas H. Hock, Milwaukee, Wis., assignor to Harley-Davidson Motor Co., Milwaukee, Wis., a corporation of Wisconsin
Filed Nov. 29, 1962, Ser. No. 240,838
5 Claims. (Cl. 192—3)

This invention relates to a vehicle control system having particular utility in golf carts and similar utility vehicles subjected to frequent short runs.

The principal object of this invention is to simplify operation of short run vehicles.

A more specific object is to make operation of the vehicle solely dependent upon operation of the accelerator (under conditions where the brake is not required) with the motor automatically de-energized when the vehicle is at rest.

A further object is to couple the brake action with the accelerator so that operation of the accelerator to move the vehicle will act to release the brake.

To accomplish these objects I have provided a control arrangement which is applicable to both gas engine powered and electric motor powered vehicles but the discussion is for the most part directed to the gas engine vehicle since this presents the more complex control problems. The ignition circuit of the engine is coupled to the accelerator so that upon release of the accelerator the ignition is cut off. The drive is also coupled to the ignition circuit to enable the starter when the engine is not running. Therefore, to start the engine the accelerator is pressed down (in foot controlled situations) and to stop the engine the accelerator is released. The brake is also coupled to the accelerator. Normally the brake is operated by any usual brake but the present brake may be foot actuated to a "set" position where it will be retained until released by foot manipulation or by pressing the accelerator down. On level surface the vehicle may be started and stopped by means of the accelerator. If the vehicle is stopped on an incline the brake must be set to hold the vehicle. The vehicle is set into motion again simply by pressing the accelerator down to start the engine and release the brake. This is a great convenience in short run operation (such as a golf cart) since the operation is simple and the engine doesn't run when left unattended.

Other objects and advantages will be pointed out in or be apparent from, the specification and claims, as will obvious modifications of the single embodiment shown in the drawings, in which:

FIGS. 3, 4, and 5 are views taken as indicated by lines 3—3, 4—4, 5—5 in FIG. 2 to show the manner in which the ignition, brake and accelerator are coupled together.

Figure 1:
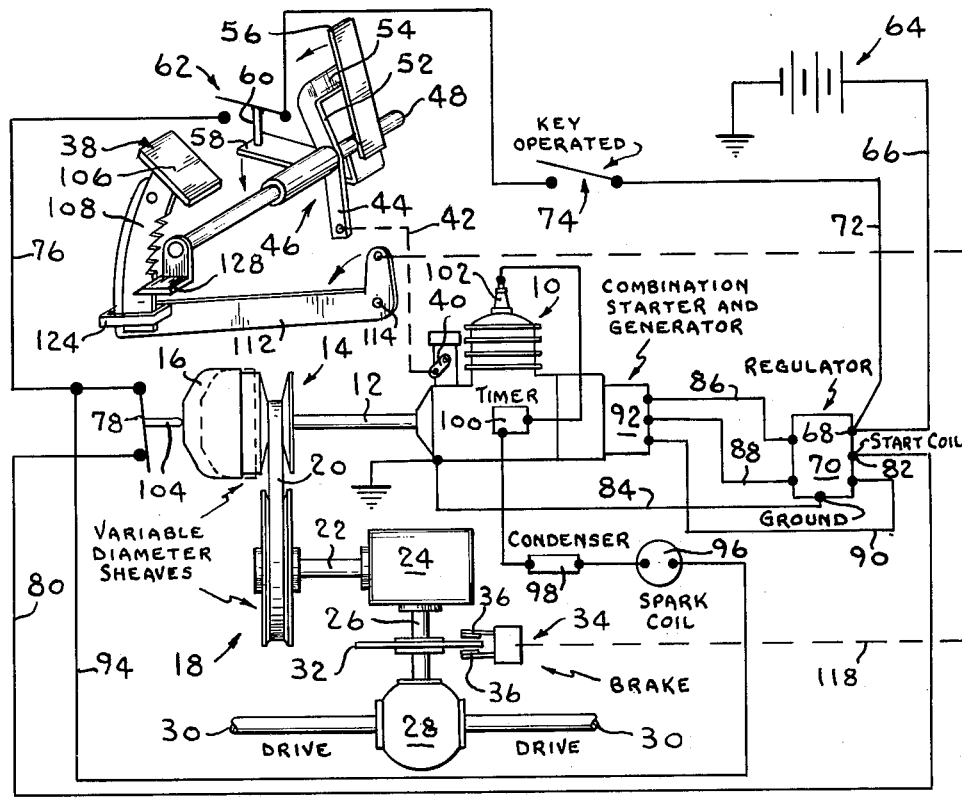
FIG. 1 is a schematic showing of the positions of the vehicle pertinent to this invention.
Figure 2:
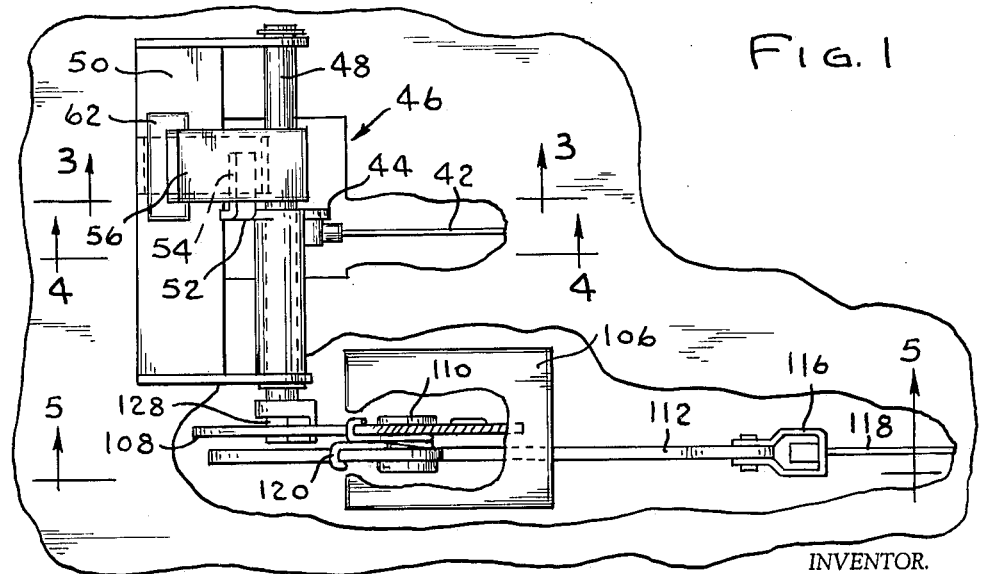
FIG. 2 is a plan view, with parts broken away, of the brake and accelerator arrangement.

Considering the drawings in detail, the vehicle is provided with a gas engine 10 having a drive shaft 12 turning a speed responsive variable diameter sheave 14 which is of the type biased to a minimum diameter position, as illustrated, and which, in response to increasing speed of the drive shaft 12, will move the left-hand sheave portion and the associated housing 16 to the right to increase the diameter of the drive sheave. This sheave is connected to a spring loaded variable diameter sheave 18 by means of belt 20 and the diameter of the output sheave 18 is varied in accordance with the changes in the diameter of the input sheave 14. Thus, as the diameter of the input sheave 14 increases the effective diameter of the output sheave 18 will decrease and this then constitutes a variable speed transmission. The output sheave 18 drives shaft 22 into gear housing 24 with the drive shaft 26 coming out of the gear housing back to the differential 28 and the power is then transmitted to the drive shaft 30. The drive shaft 26 is provided with a brake disc 32 and caliper-type brakes 34 are associated with the disc to bring the pads 36, 36 against the disc 32 when the foot pedal 38 is pressed downwardly in the usual manner. Other brake systems can be employed, if desired, without departing from the present invention. Before going on with other phases of this description it should be pointed out that the details of the variable diameter sheave 14 are not particularly important and such speed responsive variable diameter sheaves are generally known in the art, although in the present case it is preferred to use the type shown in co-pending application Serial No. 127,605.

The engine 10 is provided with the usual carburetor having a throttle link 40 actuated by a conventional push-pull cable 42 connected to the depending arm 44 of the throttle link 46 pivotally mounted on shaft 48 which is journaled in bracket 50 connected to the vehicle frame. The throttle link is provided with a generally upwardly projecting arm 52 having a laterally projecting finger portion 54 to underlie the accelerator pedal 56 fixed on shaft 48. The shaft and pedal and the switch actuator 58, also fixed on shaft 48, are biased in the direction indicated by the arrow in FIG. 3 so that in its normal position the accelerator pedal stands clear of finger 54 projecting laterally from the throttle link 46 and underlying the accelerator pedal. Obviously the accelerator pedal has a certain amount of free travel about the axis of shaft 48 from the position shown in FIG. 3 before it will pick up the throttle link 46 to actuate the throttle of the engine. During this free travel the switch actuator 58, also fixed on shaft 48, will be rotated from the position shown in FIG. 3 in which the actuator has depressed plunger 60 of the normally closed ignition enabling switch 62 to open the switch to a position in which the bracket has moved away from the plunger to allow switch 62 to close.

When the accelerator pedal 56 is in the position shown in FIG. 3 the switch 62 is open and the ignition circuit of the engine is interrupted with the result that the engine ceases to operate. Hence, the vehicle can be stopped by fully releasing the accelerator pedal to cut off the engine and allow the vehicle to come to a stop. The accelerator can be positioned to operate the vehicle at very low or idling speed before the continued clockwise motion of the pedal will act to break the ignition circuit.

The additional facets of the ignition system can well be considered at this point. The vehicle is provided with a battery 64 having its negative grounded and its positive connected by lead 66 to terminal 68 of regulator 70. Lead 72 runs from terminal 68 through a key operated ignition switch 74 to the ignition enabling switch 62. The other terminal of switch 62 is connected by lead 76 to one terminal of sensing switch 78, the other terminal of which is connected by wire 80 to the starting coil terminal 82 on the regulator. A ground lead 84 also comes out of the regulator and additional leads 86, 88, 90 lead to the combination starter and generator 92 associated with the engine 10. Lead 94 shunts the sensing switch 78 and goes to the spark coil 96, condenser 98 and timer 100 and thence to the spark plug 102.

Before going into the manner in which the brake is coupled with the accelerator operation it would be well to consider the manner in which the ignition system works. When it is desired to place the vehicle into operation the key switch 74 is closed but, with the accelerator 54 in its normal position, switch 62 is open and, hence, the engine will not start. Sensing switch 78 has its plunger 104 positioned to sense the location of the housing 16 of the variable speed sheave 14. Since the engine isn't running at this time the housing will be in its far left position and will actuate plunger 104 to close switch 78 and this then has closed the circuit through the regulator to the starting coil. Thus, the circuit to the starter is complete except for the fact that switch 62 is open. This switch is closed merely by depressing the accelerator which has the combined effect of completing the ignition circuit and opening the throttle to insure good starting characteristics of the engine. As soon as the engine starts the housing 16 will move to the right by an amount dependent upon the speed of the engine but even at idling speed this housing will move to the right a sufficient amount to allow switch 78 to open and cut out the starter. The engine continues to operate, however, since wire 94 shunts switch 78 and continues to provide power to the spark plug. The engine can now be operated at whatever speed is determined by operation of the accelerator pedal and will continue to operate until such time as the operator removes his foot completely from the pedal, at which time the pedal will be moved by its bias to open switch 62 and break the ignition circuit. Then the vehicle would coast to a stop, assuming it is being operated on level ground.

The brake pedal 106 is fixed on a segment 108 which is pivotally mounted on a pin 110 carried by the upper end of the C-shaped member 112 which is pivoted at 114 and biased in a clockwise direction about the pivot 114. The other end of the C-member 112 is provided with a connecting bracket 116 to which the brake actuating cable 118 is connected. A spring 120 is wrapped around the pivot 110 between the segment 108 and the C-member and is anchored on each of the members as illustrated to bias the segment clockwise about the pivot 110 so that normally the outer curved surface 122 bears against the limit stop 124. This, then, keeps the ratchet teeth 126 on the inside of segment 108 clear of the dog or ratchet 128 fixed on shaft 48. The brake is normally actuated by the usual application of foot pressure to the pedal which, by reason of the normal sitting position of the operator, will exert a force directly down on the pedal or will tend to rotate the pedal clockwise about pivot 110, thus keeping the ratchet teeth away from the dog. If, however, the foot pressure is applied to the upper left portion (FIG. 5) of the pedal 106 there will be a tendency to rotate the segment counterclockwise about pin 110 against the bias of spring 120. This tends to move the ratchet teeth into engagement with the dog 128. If the accelerator pedal is in its normal position (FIG. 3) the dog will be in position to engage these teeth if the pedal is actuated as last described. Therefore, on release of this pedal the dog will hold the brake pedal in a downward position and, hence, will keep the brake applied. The brake can be released by again stepping on the brake pedal in the normal manner which would withdraw the ratchet teeth from the dog. However, the brake can also be released simply by stepping on the accelerator pedal which will rotate shaft 48 in a counterclockwise direction and take dog 128 away from the ratchet teeth which will free the segment and C-member 112 for rotation in a clockwise direction about pivot 114 under the influence of the bias applied to member 112.

With the foregoing in mind it will be appreciated that if the vehicle has been parked with the brake on it can be simply placed into operation (assuming the key operated switch 74 is closed) simply by stepping on the accelerator pedal. This will permit switch 62 to close to complete the ignition circuit and to complete the circuit to the starter through switch 78. It will also operate to move ratchet 128 out of the ratchet teeth 126 and permit the brake to be released. Therefore, simply stepping on the accelerator pedal starts the engine and releases the brake. The speed of the vehicle is now controlled by the position of the accelerator pedal and when the operator desires to stop he can, if on level ground, simply release the accelerator pedal which will then go to its normal position breaking the ignition circuit by opening switch 62. The vehicle can be allowed to coast to a stop or be stopped with the foot brake. If the vehicle is on uneven ground where it is desirable to have the brake set the operator merely applies his foot more forwardly on the brake pedal so as to engage one of the ratchet teeth with the ratchet so as to retain the brake in the set position.

This arrangement has proven to be eminently satisfying in connection with vehicles such as golf carts. Heretofore gasoline powered golf carts have not enjoyed very widespread use by reason of the fact that they were customarily left running while the player was taking his shot or, if they were turned off, they involved so much manipulation to place them in operation again that the players generally preferred the electric golf cart even though the latter type of golf cart is more expensive initially and has a higher operating cost. With the present arrangement the engine is shut off every time the player leaves the cart and when the player returns to the cart it is placed into motion simply by stepping on the accelerator. If the brake has previously been set this will also release the brake which means that with this control system the cart is easier to operate than an electric cart.

This construction can also be applied to electric carts with advantage. The accelerator pedal in the electric cart can still be used to control the speed of the vehicle with the fully released position of the accelerator being selected to de-energize the electric motor. The coupling of the brake action to the accelerator pedal is obviously of advantage with either type of vehicle. It will be appreciated that the great advantage of this invention is when it is applied to a gasoline engine type of vehicle and, of course, the provision of the variable speed transmission helps in obtaining the "fully automatic" operation of the vehicle. When one considers that the engine is being started and stopped so frequently it would naturally occur to question how long the battery would last and the answer to this is, of course, that the battery will give extremely good service if an adequate generator system is provided. In practice this has proven to be true and no problems are involved with the maintenance of the battery.

As used in the claims the term "motor" will include an electric motor or a gasoline motor or gasoline engine unless by the terminology of the claim it is clear that the term is to be limited to a gasoline engine. Also in the claims the term "manually operated" will be used in conjunction with the foot brake and the foot operated accelerator although technically these are "pedally operated" or "foot operated" but it should be apparent that both of these controls can easily be provided for manual operation, that is, by the hands. Accordingly, the term "manual operation" as applied to these controls is meant to include either foot or hand operation.

Although but one embodiment of the present invention has been illustrated and described, it will be apparent to those skilled in the art that various changes and modifications may be made therein without departing from the spirit of the invention or from the scope of the appended claims.

I claim:

1. In combination, a vehicle having an internal combustion engine, an accelerator movable from an extreme position to an operational range in which engine speed is controlled between idle and full speed, an ignition and starting circuit for the engine, a single switch operated by the accelerator for enabling said circuit at all positions of the accelerator within said operational range and for disabling said circuit when the accelerator is moved from said range to said extreme position, and means biasing the accelerator to said extreme position whereby the engine is started by moving the accelerator into any position within said range and is stopped by releasing the accelerator for movement by the biasing means to said extreme position.

2. The combination according to claim 1 including a brake and means for operating the brake including means for holding the brake in its applied position, and means operated by the accelerator to release the brake when the accelerator is actuated to start the engine.

3. In a vehicle, a pivoted link, brake means operated by the link, a member pivoted on the link and having a portion adapted to be manually operated, means engageable with the member for retaining it in an actuated position, and means biasing the member away from the retaining means, said manual portion being selectively operable to rock the member against the bias into engagement with the retaining means or operable in a manner keeping the member away from the retaining means, and means for retracting the retaining means from the member, said last-mentioned means including an accelerator operable over a range of movement to determine vehicle speed, said accelerator when moved in a speed increasing direction being operative to retract said retaining means.

4. Apparatus according to claim 3 wherein there is provided a throttle means actuatable by the accelerator, lost motion means connecting the accelerator and the throttle means to allow motion of the accelerator without affecting the throttle means in the initial movement of the accelerator towards the full speed position thereof, said accelerator retracting the retaining means during such initial movement.

5. Apparatus according to claim 4 including a switch actuated by the accelerator during said initial movement, and an ignition circuit enabled by actuation of said switch.

References Cited by the Examiner
UNITED STATES PATENTS

| | | | |
|---|---|---|---|
| 836,640 | 11/1906 | Dunn & Whitaker | 74—539 |
| 914,277 | 3/1909 | Howe | 74—539 |
| 1,335,628 | 3/1920 | Watson | 74—539 |
| 1,540,170 | 6/1925 | Frick | 180—65 |
| 1,890,790 | 12/1932 | Messinger | 192—3 |
| 1,985,319 | 12/1934 | Gilmore | 192—3 |
| 2,080,295 | 5/1937 | Wheeler et al. | 192—3 |
| 2,167,646 | 8/1939 | Dyer. | |
| 2,208,364 | 7/1940 | Fusella | 192—109 |
| 2,243,068 | 5/1941 | Blue et al. | 192—3 |
| 2,816,633 | 12/1957 | Schumann | 192—3 |
| 3,163,252 | 12/1964 | Koci | 180—65 |

DAVID J. WILLIAMOWSKY, *Primary Examiner.*